United States Patent Office 3,658,903
Patented Apr. 25, 1972

3,658,903
METHOD FOR CHLORINATING SUBSTITUTED GUANIDINES AND RESULTING PRODUCT COMPOUNDS
Clifford L. Coon, Fremont, and Derek Tegg, Palo Alto, Calif., assignors to Standard Research Institute, Menlo Park, Calif.
No Drawing. Filed Dec. 29, 1969, Ser. No. 888,818
Int. Cl. C07c 129/00
U.S. Cl. 260—564 A
7 Claims

ABSTRACT OF THE DISCLOSURE

Hydrocarbyl- or loweralkanoic acid-substituted guanidines, when reacted with a large excess (at least 10×) of hypochloride under acid conditions, form polychloro product compounds wherein all the hydrogens on the nitrogen atoms are replaced by chlorine. The compounds so formed are typified by tetrachloroguanidinomethane and tetrachloroguanidinophenylmethane, formed from salts of methyl guanidine and N-benzylguanidine, respectively, as well as by the cyclic compound 4,4-bis(dichloroaimno)-3-chlorobutyrolactone, formed from guanidine acetic acid. The compounds have a high content of available chlorine and are useful as chlorinating agents, bleaches and disinfectants.

SUMMARY OF THE INVENTION

This invention rests on the discovery that novel polychloro derivatives of guanidine can be prepared by reacting a substituted guanidine compound having the formula:

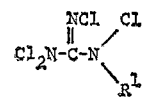

wherein R is alkyl, cycloalkyl, aralkyl, guanidinoalkyl or acetic acid (—CH$_2$COOH), with a large excess of a hypochlorite compound in an aqueous medium under acid conditions, the reaction proceeding rapidly at room temperatures. The resulting product compounds, wherein the hydrogen atoms attached to nitrogen in the guanidino molecule are replaced by chlorine, are stable crystalline solid or liquid compounds ranging in color from white to light yellow to orange which are substantially insoluble in water and of good solubility in acetone, benzene, ethanol, methylene chloride and other organic solvents. Said compounds have a high content of available chlorine and are useful as chlorinating agents, bleaches and disinfectants.

As employed herein and in the claims, the term "alkyl" designates alkyl groups such as methyl, ethyl, propyl, isopropyl, n-butyl, isobutyl, pentyl, hexyl, 2-ethylhexyl, decyl, dodecyl, hexadecyl or octodecyl, for example. "Guanidinoalkyl" represents a guanidino group attached to alkyl, as herein defined. "Aralkyl" is employed to designate groups such as benzyl, xylyl, phenethyl, phenylpropyl and phenyldecyl or the like. "Cycloalkyl" refers to groups such as cyclohexyl, methyl cyclohexyl, ethyl cyclohexyl, dimethyl cyclohexyl, cyclohexylmethyl, cyclohexylbutyl, cyclohexyldecyl and the like. As indicated, R may also be the acetic acid, or carboxymethyl group, —CH$_2$COOH.

The compounds formed by reacting hypochlorite with a guanidine substituted by alkyl, cycloalkyl, aralkyl or guanidinoalkyl are substituted tetrachloroguanidines having the structure:

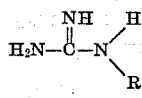

wherein R$^1$ is an alkyl group of from 1 to 18 carbon atoms, a cyclohexyl, alkyl cyclohexyl or cyclohexyalkyl group of from 6 to 16 carbon atoms, a phenalkyl group of from 7 to 16 carbon atoms or a tetrachloroguanidinoalkyl wherein the alkyl group contains from 1 to 18 carbon atoms. In the case of the guanidinoacetic acid reactant, the product is a cyclic compound (4,4-bis(dichloramino)-3-chloroazabutyrolactone) having the structure:

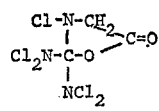

In addition to the above cyclic compound, other illustrative compounds of the present invention which can be produced by the novel process described below include:

tetrachloroguanidinomethane,
1,4-bis(tetrachloroguanidino)butane,
1-(tetrachloroguanidino)decane,
1-(tetrachloroguanidino)hexadecane,
tetrachloroguanidinophenylmethane,
1-(tetrachloroguanidino)butane,
1,12-bis(tetrachloroguanidino)dodecane,
tetrachloroguanidinocyclohexane,
1-(tetrachloroguanidino)octadecane and their homologues and analogues.

In accordance wtih the present invention, the foregoing and other useful compounds hereof can be produced by contacting the substituted guanidino compound in aqueous solution with a large excess of hypochlorite in the presence of a strong acid. The guanidine reactant is added in water-soluble form, usually as the salt of a mineral acid, though the acetic acid derivative is itself water-soluble. The hypochlorite can be added in the form of a sodium, potassium or other alkali metal hypochlorite salt, and the amount thereof to be employed is at least 10× over the stoichiometric amount required to effect the desired chlorination step. Good results can be had when the excess of this reagent is as much as 30×, 40× or even more.

The reaction is conducted in the presence of a strong acid such as hydrochloric or sulfuric acids, for example, said acids being employed on essentially an equimolar basis with respect to the hypochlorite so as to convert the latter to HOCl. A moderate excess of either hypochlorite or acid does not interfere with the reaction.

As indicated above, the reaction takes place in an aqueous medium to which the reactants can be added in any order. Preferably, however, an aqueous solution of the substituted guanidino reactant and the necessary acid is added to a stirred aqueous solution of the hypochlorite, thereby insuring the presence of the desired excess of hypochlorite at all times.

The reaction is preferably conducted over a water-immiscible organic solvent which takes up the desired polychlorinated guanidino product, which is water-insoluble, as it is formed. This practice also has the advantage that the end point of the reaction can readily be detected, it coinciding with a clearing of the aqueous, supernatant fluid which can then be decanted off or otherwise removed. Organic solvents which can be employed for this purpose include those which are inert under the reaction conditions employed and which preferably have a density greater than 1. Representative solvents of this character include methylene chloride, chloroform, carbon tetrachloride, ether, ethylene dichloride and monofluorotrichloromethane, as well as other Freons.

The reaction temperature employed is not critical and good results can be obtained at temperatures of from about 10° to 40° C. Ambient temperatures are preferred. Chlorination takes place rapidly and is usually complete within a period of 1 to 30 minutes after the reactants have been completely brought together, as evidenced by the presence of a relatively clear aqueous layer.

Once the organic phase has been recovered from the reaction mixture, the polychlorinated product can be recovered from said phase by conventional methods known to the skilled in the art. Thus, the product can be dried by adding magnesium sulfate or sodium sulfate to the organic phase, then filtering the liquid and distilling the solvent therefrom. The product can be purified by conventional methods including recrystallization, the use of a silica gel or other chromatographic column, or by distillation.

DESCRIPTION OF THE PREFERRED EMBODIMENTS

The following examples illustrate the invention but are not to be construed as limiting:

EXAMPLE 1

Tetrachloroguanidinomethane

To 338 ml. of an aqueous 5.25% sodium hypochlorite solution, stirred over 40 ml. of methylene chloride, was added over a 10 minute period a solution of 2.44 g. of methyl guanidine sulfate and 19.8 ml. of 37% HCl in 20 ml. of water. This represented a 16× excess of hypochlorite. After the aqueous layer became clear the methylene chloride phase was separated, dried ($MgSO_4$), and the solvent removed leaving 3.00 g. of an orange liquid. This product was purified by distillation (45–46°, 0.006 mm. Hg) giving 2.4 g. of a light yellow liquid which was identified as tetrachloroguanidinomethane by its infrared spectrum and elemental analysis, the results of the latter being as follows:

Calc'd for $C_2H_3N_3Cl_4$ (percent): C, 11.38; H, 1.43; N, 19.92; Cl, 67.27. Found (percent): C, 11.80; H, 1.37; N, 18.97; Cl, 68.12.

This compound is insoluble in water and of good solubility in acetone and benzene.

EXAMPLE 2

1,4-bis(tetrachloroguanidino)butane

To 168 ml. of a 5.25% aqueous solution of sodium hypochlorite, stirred over 20 ml. of methylene chloride, was added dropwise over a 5 min. period a solution of 0.50 g. of diguanidinobutane sulfate and 9.8 ml. of 37% HCl in 10 ml. of water. This represented a 24× excess of hypochlorite. When the aqueous phase was almost clear the methylene chloride phase was separated, dried ($MgSO_4$), and the solvent removed leaving 0.83 g. of an orange solid. Two recrystallizations from hexane gave 0.40 g. of a light orange solid, M.P. 55–58°. This product was identified as 1,4-bis(tetrachloroguanidino)butane by its infrared spectrum and elemental analysis, the results of the latter being as follows:

Calc'd for $C_6H_8N_6Cl_8$ (percent): C, 16.09; H, 1.79; N, 18.76; Cl, 63.36. Found (percent): C, 16.21; H, 1.83; N, 18.61; Cl, 62.90.

This compound is water-insoluble and of good solubility in benzene, acetone and hexane.

EXAMPLE 3

1-(tetrachloroguanidino)decane

To 340 ml. of a 5.25% aqueous solution sodium hypochlorite, stirred over 30 ml. of methylene chloride, was added dropwise over a 10 min. period a solution of 1.5 g. of decylguanidine sulfate and 19.9 ml. of 37% HCl in 20 ml. of water. This repersented a 24× excess of hypochlorite. After the mixture was stirred for an additional 15 min., the methylene chloride phase was separated, dried ($MgSO_4$), and the solvent removed under vacuum leaving 1.6 g. of a yellow liquid which was impure 1-(tetrachloroguanidino)decane. The product was purified by means of a silica gel column using a 50/50 v. mixture of hexane and chloroform as eluant. The first yellow portion which eluted was collected. The solvent was removed under vacuum leaving 0.9 g. of a yellow liquid which was identified as 1-(tetrachloroguanidino)-decane by its infrared spectrum and elemental analysis, the results of the latter being as follows:

Calc'd for $C_{11}H_{21}N_3Cl_4$ (percent): C, 39.2; H, 6.28; N, 12.47; Cl, 42.85. Found (percent): C, 39.49; H, 6.15; N, 12.52; Cl, 41.71.

This compound is water-insoluble and of good solubility in organic solvents.

EXAMPLE 4

1-(tetrachloroguanidino)hexadecane

To 341 ml. of a 5.25% sodium hypochlorite solution, stirred over 30 ml. of methylene chloride, was added over a 15 min. period a solution of 2.0 g. of hexadecylguanidine sulfate and 19.9 ml. of 37% HCl in 20 ml. of water. This represented a 20× excess of hypochlorite. After stirring for 20 min. the organic phase was isolated, dried ($MgSO_4$), and the solvent removed under vacuum leaving 1.50 g. of a yellow liquid. The product was purified by means of a silica gel column using a 50/50 v. mixture of hexane and chloroform as eluant. The first yellow band which eluted gave 1.2 g. of a yellow liquid which was identified as 1-(tetrachloroguanidino)hexadecane by its infrared spectrum and elemental analysis, the results of the latter being as follows:

Calc'd for $C_{17}H_{33}N_3Cl_4$ (percent): C, 48.5; H, 7.9; N, 10.0; Cl, 33.7. Found (percent): C, 50.3; H, 8.2; N, 9.3; Cl, 32.5.

The compound is insoluble in water and of good solubility in acetone, benzene and hexane.

EXAMPLE 5

Tetrachloroguanidinophenylmethane

To 115 ml. of a 5.25% sodium hypochlorite solution, stirred over 20 ml. of methylene chloride, was added over a 5 min. period a solution of 1.00 g. of N-benzylguanidine sulfate and 6.7 ml. of 37% HCl in 20 ml. of water. This represented a 24× excess of hypochlorite. When the aqueous layer was almost clear, the methylene chloride phase was separated, dried ($MgSO_4$), and the solvent removed under vacuum leaving 1.41 g. of an orange oil which solidified upon standing. Recrystallization from hexane gave 0.95 g. of a yellow crystalline compound, M.P. 75–78° C., which was identified as tetrachloroguanidinophenylmethane by its infrared spectrum and elemental analysis, the results of the latter being as follows:

Calc'd for $C_8H_7N_3Cl_4$ (percent): C, 33.45; H, 2.46; N, 14.63; Cl, 49.46. Found (percent): C, 33.63; H, 2.54; N, 14.86; Cl, 48.89.

This compound is insoluble in water and of good solubility in hexane and benzene.

EXAMPLE 6

1-(tetrachloroguanidino)butane

To 130 ml. of 5.25% sodium hypochlorite solution, stirred over 30 ml. of methylene chloride, was added over a period of 10 min. a solution of 2.50 g. of butylguanidine sulfate and 7.65 ml. of 37% HCl in 15 ml. of water. This represents a 16× excess of hypochlorite. When the aqueous layer was almost clear, the methylene chloride phase was separated, dried ($MgSO_4$), and the solvent removed under vacuum leaving 3.36 g. of an orange liquid. This sample was purified by distilaltion (3.13 g., 66° C., 0.005 mm. Hg) and identified as 1-(tetrachloroguanidino)butane by its infrared spectrum and elemental analysis, the results of the latter being as follows:

Calc'd for $C_5H_9N_3Cl_4$ (percent): C, 23.73; H, 3.59; N, 16.61; Cl, 56.07. Found (percent): C, 23.90; H, 3.66; N, 16.79; Cl, 55.85.

EXAMPLE 7

1,12-bis(tetrachloroguanidino)dodecane

To 580 ml. of 5.25% sodium hypochlorite, stirred over 30 ml. of methylene chloride, was added portionwise over a 10 min. period of suspension of 2.0 g. of diguanidinododecane sulfate, 34 ml. of 37% HCl, and 34 ml. water. This represents a 32×excess of hypochlorite. After stirring for an additional 15 min. the methylene chloride phase was separated, dried (MgSO$_4$), and the solvent removed under vacuum leaving 1.9 g. of an orange liquid which was impure 1,12-bis(tetrachloroguanidino)dodecane. The product was purified by passing it through a silica gel column using an 80/20 v. mixture of hexane/CHCl$_3$ as eluant. The first yellow band which eluted contained the product; removal of solvent left 1.1 g. of a yellow liquid which was identified as 1,12-bis(tetrachloroguanidino)dodecane by its infrared spectrum and elemental analysis, the results of the latter being as follows:

Calc'd for $C_{14}H_{24}N_6Cl_8$ (percent): C, 30.02; H, 4.32; N, 15.01; Cl, 50.65. Found (percent): C, 30.65; H, 4.49; N, 14.56; Cl, 50.30.

EXAMPLE 8

4,4-bis(dichloroamino)-3-chlorazabutyrolactone

To 970 ml. of 5.25% sodium hypochlorite solution, stirred over 50 ml. of methylene chloride, was added dropwise over a 15 min. period a solution of 5.00 g. of guanidineaectic acid and 57 ml. of 37% HCl in 50 ml. of water. This represents a 10×excess of hypochlorite. When the aqueous phase became clear, the methylene chloride phase was separated, dried (MgSO$_4$), and the solvent removed under vacuum leaving 3.30 g. of a white crystalline solid. Recrystallization from CFCl$_3$ gave 3.01 g. of long, white needles, M.P. 80–81°. This compound was identified as 4,4-bis(dichloroamino)-3-chlorazabutyrolactone by its infrared spectrum and elemental analysis, the results of these tests being as follows:

Infrared spectrum: 5.40 (s.), 6.85 (s.), 7.27 (m.), 8.32 (s.), 8.55 (m.), 9.36 (m.), 9.9 (m.), 0.5μ (m.).

Calc'd for $C_3H_2N_3O_2Cl_5$ (percent): C, 12.45; H, 0.70; N, 14.52; Cl, 61.27. Found (percent): C, 12.66; H, 0.71; N, 14.19; Cl, 60.60.

This compound is substantially insoluble in water. It is of good solubility in benzene and acetone.

The polychloro guanidine derivatives of this invention are characterized by a high content of available chlorine, the latter rainging from 67.4% to 134.5% in the case of the compounds of Examples 1–8. This chlorine is readily released when the trichloroguanidine compounds are admixed with small or even trace amounts of activated charcoal in an appropriate solvent medium for the compounds such, for example, as methylene chloride, acetone or benzene. In this reaction, two molecules of the compound become linked to one another through a double bond in accordance with the following typical reaction:

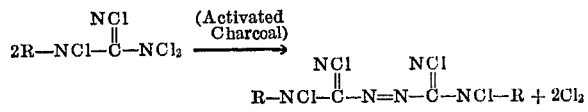

wherein R is as defined above.

The compounds of the present invention, while stable when stored at ambient conditions, are spontaneously reactive towards compounds containing carbon-to-carbon double bonds. Thus, a vigorous reaction takes place when any one of said compounds is added to cyclohexene, 1-octene or allyl bromide. In these reactions the polychloroguanidine compound acts as a chlorinating agent, with the chlorine adding to the double bond of the co-reactant compound. In this manner, for example, when tetrachloroguanidinomethane is added to cyclohexene, there is formed a product identified as trans-1,2-dichlorocyclohexane.

The substituted guanidine starting materials employed in a practice of this invention can be prepared by methods known to those skilled in the art. Thus, diguanidinododecane can be prepared by reacting 1,12-diaminododecane with S-methyl-thiourea in water at 110° C. until methyl mercaptan ceases to evolve. The reaction mixture is then cooled, thereby precipitating out the desired compound. Similarly, butylguanidine can be prepared by reacting the S-methylthiourea with butylamine in aqueous solution using a 2×excess of the amine, keeping the reaction mixture at 10 to 0° C. as the reactants are brought together, and then heating at 90° C. for 5 hours until the methyl mercaptan has been distilled off. The solution is then evaporated to dryness, with the remaining product being taken up in benzene and recrystallized therefrom. Benzylguanidine can be prepared by reacting cyanamide with benzylamine, the reaction proceeding very readily. Sulfate or other water-soluble salts of the substituted guanidine starting compounds can be made by conventional methods.

As many embodiments of this invention can be made without departing from the spirit and scope thereof, it is to be understood that the invention includes all such embodiments and modifications thereof as may come within the scope of the appended claims.

We claim:

1. Substituted tetrachloroguanidine compounds having the structure:

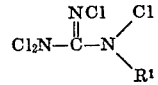

wherein $R^1$ is an alkyl group of from 1 to 18 carbon atoms, a cyclohexyl, alkyl cyclohexyl or cyclohexylalkyl group of from 6 to 16 carbon atoms, a phenalkyl group of from 7 to 16 carbon atoms or tetrachloroguanidinoalkyl wherein the alkyl group contains from 1 to 18 carbon atoms.

2. The compound as defined in claim 1 which is tetrachloroguanidinomethane.

3. The compound as defined in claim 1 which is 1,4-bis(tetrachloroguanidino)butane.

4. The compound as defined in claim 1 which is 1-(tetrachloroguanidino)decane.

5. The compound as defined in claim 1 which is 1-(tetrachloroguanidino)hexadecane.

6. The compound as defined in claim 1 which is 1-tetrachloroguanidino)butane.

7. The compound as defined in claim 1 which is 1-(tetrachloroguanidino)dodecane.

References Cited
UNITED STATES PATENTS 3,406,170   10/1968   Papa _____ 260—564 A
3,526,664   9/1970    Coon _____ 260—564

LEON ZITVER, Primary Examiner

G. A. SCHWARTZ, Assistant Examiner

U.S. Cl. X.R.

252—188; 260—307 A, 999